(12) United States Patent
Rood

(10) Patent No.: US 6,859,950 B2
(45) Date of Patent: Mar. 1, 2005

(54) APPARATUS AND METHODS FOR DRAIN STRAINER ASSEMBLY INSTALLATION AND MAINTENANCE

(75) Inventor: John C. Rood, Seattle, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/426,298

(22) Filed: Apr. 29, 2003

(65) Prior Publication Data

US 2004/0216222 A1 Nov. 4, 2004

(51) Int. Cl.⁷ .................................................. A47K 1/14
(52) U.S. Cl. ................ 4/286; 4/679; 4/292; 4/DIG. 14; 210/238; 210/459; 210/470
(58) Field of Search .......................... 4/679, 664, 663, 4/662, 286, 289–292, DIG. 14; 210/162, 238, 459, 470, 447, 448

(56) References Cited

U.S. PATENT DOCUMENTS

| | | | |
|---|---|---|---|
| 2,660,317 A | * | 11/1953 | Mork et al. .................. 210/434 |
| 4,376,053 A | * | 3/1983 | Bullock et al. ............. 210/767 |
| 4,426,286 A | * | 1/1984 | Puckett et al. .............. 210/121 |
| 4,586,203 A | | 5/1986 | Westgerdes |
| 4,984,309 A | | 1/1991 | Lowry |
| 5,232,010 A | | 8/1993 | Rozenblatt et al. |
| 5,689,928 A | | 11/1997 | Rasksen |
| 5,940,898 A | | 8/1999 | Rowe |
| 6,006,373 A | | 12/1999 | Hoang |
| 6,079,669 A | * | 6/2000 | Hanay et al. ............ 244/118.5 |
| 6,223,361 B1 | | 5/2001 | Rozenblatt |
| 6,385,789 B1 | | 5/2002 | Pondelick et al. |
| 6,601,242 B1 | | 8/2003 | Rebischke |

FOREIGN PATENT DOCUMENTS

DE  196 12 353 A1  10/1997

* cited by examiner

Primary Examiner—Khoa D. Huynh
(74) Attorney, Agent, or Firm—Black Lowe & Graham, PLLC; Dale C. Barr

(57) ABSTRACT

Apparatus and methods for drain strainer installation and maintenance are disclosed. In one embodiment, a drain strainer assembly includes a housing having an interior chamber and defines an opening leading to the interior chamber. Inlet and outlet ports are disposed through the housing, and at least one coupling device couples the housing to a support wall such that the opening is at least approximately parallel with the support wall. The assembly further includes a strainer member positioned in the interior chamber at least partially between the inlet and outlet ports, and a door member covering the opening.

38 Claims, 5 Drawing Sheets

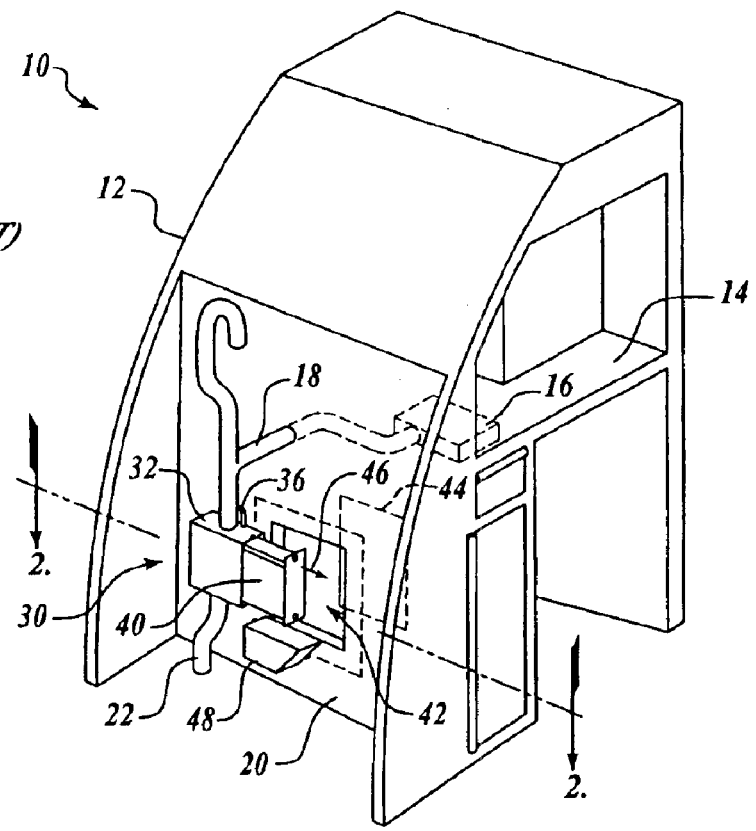
Fig.1
*(PRIOR ART)*
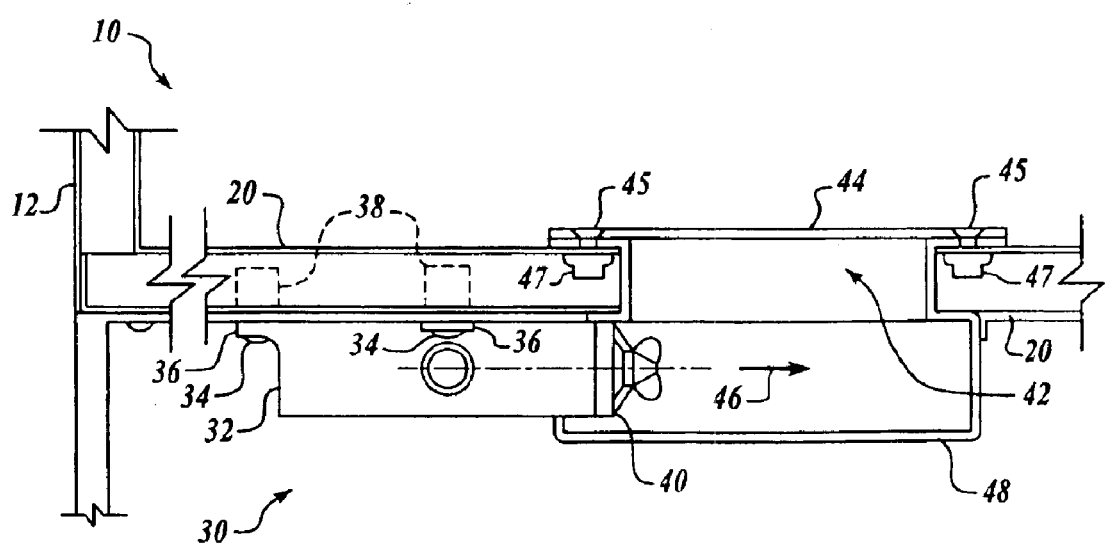
Fig.2 *(PRIOR ART)*

APPARATUS AND METHODS FOR DRAIN STRAINER ASSEMBLY INSTALLATION AND MAINTENANCE

FIELD OF THE INVENTION

The present disclosure relates generally to drain strainer assemblies and, more specifically, to drain strainer assemblies of the type used, for example, in commercial aircraft, trains, ships, and other applications.

BACKGROUND OF THE INVENTION

Drain strainers may be found in virtually any environment where food and beverages are served. Many passenger vehicles, for example, aircraft, trains, and ships, are equipped to serve food and beverages to the passengers. To facilitate such services, the vehicle may be equipped with a galley in which the food and beverages are handled. The galley may be equipped with a catch basin to allow convenient disposal of waste fluids. An important consideration in the operation of such food and beverage services is the continued operation and successful maintenance of the plumbing associated with the catch basin. Thus, the plumbing may be equipped with a removable drain strainer that strains debris and particulates from the waste fluids, thereby preventing clogs and other associated plumbing problems.

FIG. 1 is an isometric view of a galley assembly 10 in accordance with the prior art. The galley assembly 10 includes a support structure 12 with a counter surface 14 having a catch basin (or sink) 16 disposed therein. The catch basin 16 is coupled to a first conduit 18 that passes through a support wall 20 of the support structure 12. A drain strainer assembly 30 is attached to the support wall 20 and is fluidly coupled to the first conduit 18. A second conduit 22 is fluidly coupled to the drain strainer assembly 30 and leads away from the drain strainer assembly 30 to, for example, a holding tank (not shown).

FIG. 2 is an enlarged, top elevational view of the prior art drain strainer assembly 30 of FIG. 1. As shown in FIGS. 1 and 2, the drain strainer assembly 30 includes a housing 32 coupled to the support wall 20 by a plurality of threaded fasteners 34. Each threaded fastener 34 passes through a flange portion 36 of the housing 32 and threadedly engages a threaded insert nut (or threaded hole) 38 disposed in the support wall 20, thereby securing the housing 32 to the support wall 20. A strainer member (or basket) 40 is removeably inserted into the housing 32. An opening 42 is disposed in the support wall 20, thereby allowing access to the drain strainer assembly 30 by removal of an access panel 44. As shown in FIG. 2, the access panel 44 is attached to the support wall 20 by screws 45 that engage insert nuts 47 located within the support wall 20.

In operation, waste liquids dumped into the catch basin 16 flow through the first conduit 18 and pass through the strainer member 40 of the drain strainer assembly 30, where the strainer member 40 captures relatively large debris and particulate matter from the waste fluid. The resulting strained fluid then passes out of the drain strainer assembly 30 through the second conduit 22. Drain strainer assemblies 30 of the type shown in FIGS. 1 and 2 are widely-known and commercially-available, including, for example, the drain strainer assemblies designated as part number MOD50338 available from Modem Manufacturing, Inc. of Renton, Wash. For cleaning and maintenance of the drain strainer assembly 30, the strainer member 40 may be withdrawn from the housing 32 by pulling the strainer member 40 in a lateral direction indicated by an arrow 46, and then withdrawing the strainer member 40 through the opening 42. A drip pan 48 is attached to the support wall 20 beneath the opening 42 to catch waste fluid or debris that may fall from the strainer member 40 during the removal operation.

Desirable results have been achieved using the prior art galley assembly 10. However, improvements may be possible. For example, the installation of the drain strainer assembly 30 in the prior art galley assembly 10 involves a substantial number of components, including the drain strainer assembly 30, the threaded fasteners 34, the insert nuts 38, the drip pan 48 and its associated fasteners and insert nuts, and the access panel 44 and its associated screws 45 and insert nuts 47. In addition, the drip pan 48 may be coupled to additional components to facilitate removal of any waste fluid caught therein. Therefore, it may be desirable to reduce the number of components associated with the installation of the drain strainer assembly 30.

Furthermore, because the cleaning and maintenance of the drain strainer assembly 30 requires removal of the access panel 44, and the withdrawal of the strainer member 40 from the housing 32 in the lateral direction 46, it may also be desirable to simplify the procedures involved in cleaning and maintaining the drain strainer assembly 30.

SUMMARY OF THE INVENTION

The present invention is directed to drain strainer assemblies, and to apparatus and methods for installing and maintaining drain strainer assemblies. Apparatus and methods in accordance with the present invention may advantageously provide substantial improvements over the prior art, including decreasing the number of components required, improving the efficiency of routine maintenance operations, and providing improved utilization of space within the vehicle.

In one embodiment, a drain strainer assembly in accordance with the invention includes a housing having an interior chamber, an opening leading to the interior chamber, and inlet and outlet ports disposed through the housing in fluid communication with the interior chamber. The housing further includes at least one coupling device adapted to couple the housing to a support wall such that the opening is at least approximately parallel with the support wall. The assembly further includes a strainer member adapted to be inserted through the opening and positioned in the interior chamber at least partially between the inlet and outlet ports, and a door member covering the opening.

BRIEF DESCRIPTION OF THE DRAWINGS

The preferred and alternative embodiments of the present invention are described in detail below with reference to the following drawings.

FIG. 1 is an isometric view of a galley assembly in accordance with the prior art;

FIG. 2 is an enlarged, top elevational view of a drain strainer assembly of the galley assembly of FIG. 1;

DETAILED DESCRIPTION OF THE INVENTION

The present invention relates to drain strainer assemblies, and to apparatus and methods for installing and maintaining drain strainer assemblies. Many specific details of certain embodiments of the invention are set forth in the following description and in FIGS. 3–10 to provide a thorough understanding of such embodiments. One skilled in the art, however, will understand that the present invention may have additional embodiments, or that the present invention may be practiced without several of the details described in the following description.

Figure 3:
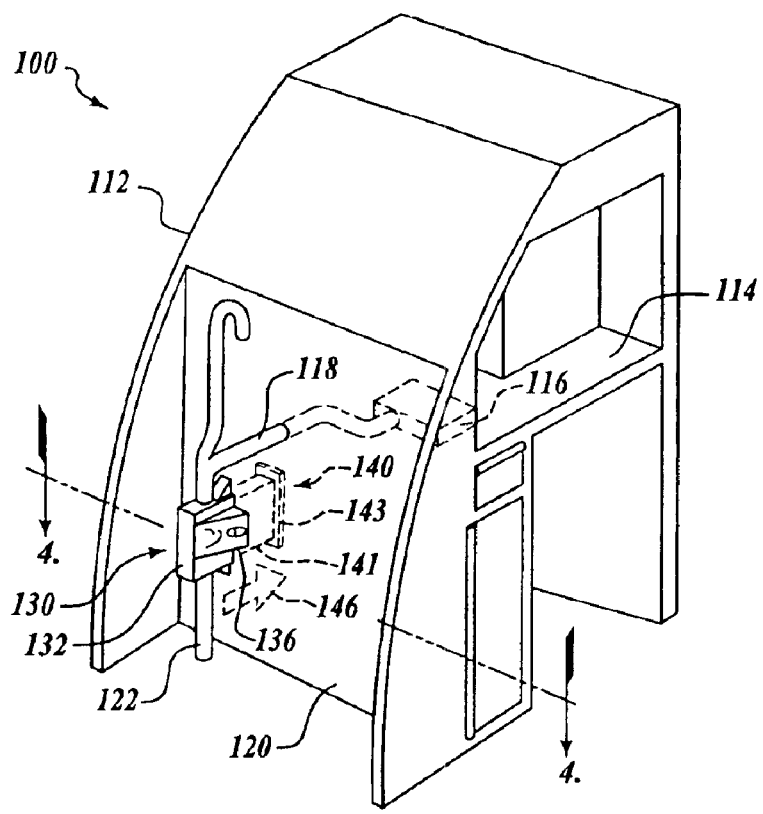
FIG. 3 is an isometric view of a galley assembly in accordance with an embodiment of the invention.
Figure 4:
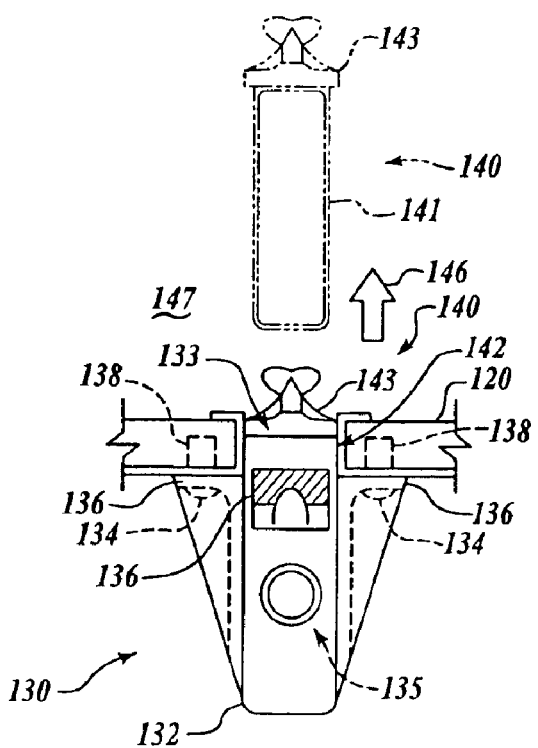
FIG. 4 is an enlarged, top elevational view of a drain strainer assembly of the galley assembly of FIG. 3.

FIG. 3 is an isometric view of a galley assembly 100 in accordance with an embodiment of the invention. FIG. 4 is an enlarged, top elevational view of a drain strainer assembly 130 of the galley assembly 100 of FIG. 3. As described more fully below, the drain strainer assembly 130 is installed in the galley assembly 100 in a manner that entails fewer components and that greatly improves the maintainability of the drain strainer assembly 130 in comparison with the prior art.

With reference to FIG. 3, the galley assembly 100 includes a support structure 112 having a counter surface 114. A catch basin 116 is disposed in the counter surface 114 and is fluidly coupled to a first conduit 118 that passes through a support wall 120 of the support structure 112. A drain strainer assembly 130 is attached to the support wall 120. The drain strainer assembly 130 is fluidly coupled to the first conduit 118 and to a second conduit 122 that leads away from the drain strainer assembly 130.

As best shown in FIG. 4, the drain strainer assembly 130 includes a box-like housing 132 having an opening (or open face) 133 that leads to an interior 135 of the housing 132. The housing 132 is positioned such that the opening 133 is substantially facing an access aperture 142 disposed in the support wall 120. In the embodiment shown in FIG. 4, the housing 132 includes a plurality of flange portions 136 distributed about the periphery of the opening 133. A plurality of threaded fasteners 134 pass through the flange portions 136 and threadedly engage corresponding threaded insert nuts (or threaded holes) 138. Thus, the housing 132 is attached to the support wall 120 with the opening 133 substantially facing and substantially aligned with the access aperture 142 in the support wall 120.

As further shown in FIGS. 3 and 4, a strainer member 140 is removeably inserted through the opening 133 into the interior 135 of the housing 132. The strainer member 140 includes a porous member 141 that is received into the interior 135 of the housing 132, and a door member 143 that substantially encloses and sealably engages the opening 133. The strainer member 140 further includes a locking mechanism 145 that may be actuated to secure the strainer member 140 within the housing 132.

In operation, the drain strainer assembly 130 may be accessed for cleaning or routine maintenance by withdrawing the strainer member 140 in a direction indicated by an arrow 146 directly out through the access aperture 142 to an interior side 147 of the support wall 120. Consequently, any waste fluid or debris that may drip or fall from the strainer member 140 during the removal operation does so on the interior side 147 of the support wall 120, where it may be easily and conveniently cleaned up and collected for disposal.

The galley assembly 100 may provide substantial advantages over the prior art. For example, the number of components involved in the installation of the drain strainer assembly 130 may be reduced in comparison with the prior art galley assembly 10 described above. Because the housing 132 is attached to the support wall 120 with the opening 133 substantially facing and substantially aligned with the access aperture 142, the strainer member 140 is accessible directly from the interior side 147 of the support wall 120. Therefore, the access panel 44 and its associated screws 45 and insert nuts 47 are eliminated, reducing the number of components involved in the installation. Also, there is no need for the drip basket 48 or its associated drain components, thereby providing a further reduction in the number of components entailed in the installation.

Furthermore, the galley assembly 100 may improve the efficiency of routine maintenance operations involving the drain strainer assembly 130. Because the strainer member 140 may be withdrawn directly into the interior side 147 of the support wall 120, maintenance personnel are no longer required to remove a separate access panel 44 and reach through a relatively small access opening 142 in order to detach and withdraw the strainer member 140 for cleaning or other routine maintenance. This advantage may simplify the maintenance of the drain strainer assembly 130, thereby reducing the labor and cost associated with these operations. In addition, because the strainer member 140 is withdrawn into the interior side 147 of the support wall 120, any dripping or spillage of waste fluid or debris that occurs from the porous member 141 during withdrawal occurs on the interior side 147 of the support wall 120, and is readily accessible for cleanup. This additional advantage may further reduce the labor and expense associated with maintenance of the drain strainer assembly 130.

Yet another advantage of the galley assembly 100 is that space within the vehicle may be more effectively utilized. Because the strainer member 140 may be withdrawn in the direction indicated by the arrow 146 directly into the interior side 147 of the support wall 120, there is no need to equip the support wall 120 with a relatively-large access panel 44 as required by the prior art assembly (FIG. 1). There is also no need to provide a space behind the support wall 120 that allows the strainer member 140 to be withdrawn from the housing 132 in the lateral direction 46 (FIG. 1) prior to being withdrawn through the support wall 120 to the interior side 147. In this way, the galley assembly 100 may allow for more effective utilization of space on and behind the support wall 120 in comparison with the prior art assembly.

A variety of alternate embodiments in accordance with the invention may be conceived, and the apparatus and methods in accordance with the invention are not limited to the particular embodiments described above and shown in FIGS. 3 and 4. In the following discussion, alternate embodiments will be described. For the sake of brevity, however, only significant differences in the structure and operation of these alternate embodiments will be described in detail.

Figure 5:
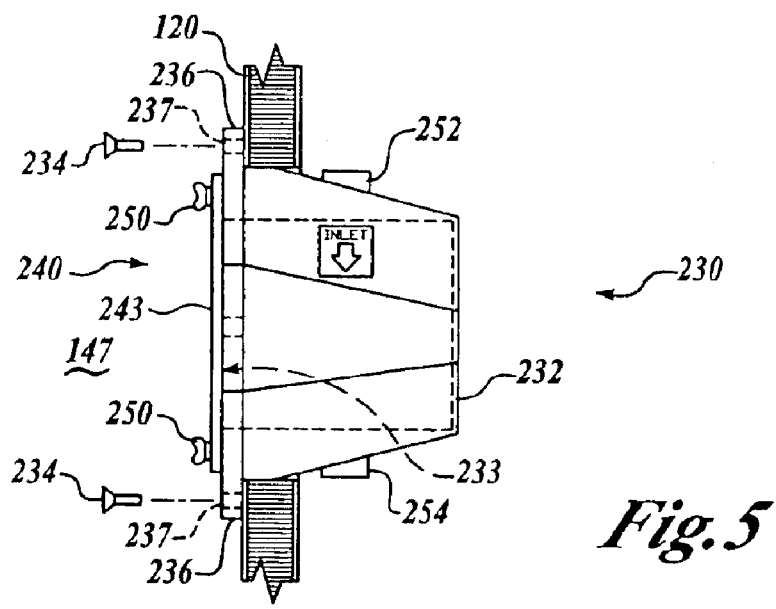
FIG. 5 is an enlarged, side elevational view of a drain strainer assembly in accordance with an alternate embodiment of the invention.

It will be appreciated that the drain strainer assembly may be mounted to the support wall 120 in a variety of different ways. For example, FIG. 5 is an enlarged, side elevational view of a drain strainer assembly 230 in accordance with an alternate embodiment of the invention. The drain strainer assembly 230 includes a housing 232 having mounting flanges 236, an inlet pipe 252 that projects upwardly to engage with the first conduit 118 (FIG. 3), and an outlet pipe 254 that projects downwardly to engage with the second conduit 122 (FIG. 3). In this embodiment, however, the mounting flanges 236 engage against the support wall 120 on the interior side 147 of the support wall 120. A mounting hole 237 is disposed through each mounting flange 236, and a fastener 234 is engaged through each mounting hole 237 to secure the mounting flange 236 to the support wall 120. Locking members 250 secure the door member 243 to the housing 232. Thus, as shown in FIG. 5, the opening 233 of the housing 232, and the locking members 250 and door member 243 of the strainer member 240 are readily accessible from the interior side 147.

The drain strainer assembly 230 shown in FIG. 5 may provide the all of the advantages noted above, and may further improve the efficiency of the installation and maintenance of the drain strainer assembly. Because the drain strainer assembly 230 is attached to the interior side 147 of the support wall 120, the drain strainer assembly 230 may be easier to install, or to remove and replace, than the prior art device. Furthermore, because the locking members 250 and the door member 243 of the strainer member 240, and the opening 233 of the housing 232 are readily accessible from the interior side 147, this additional feature may improve the accessibility of the device, and may further simplify and improve the maintainability of the drain strainer assembly 230 over the prior art.

Figure 6:
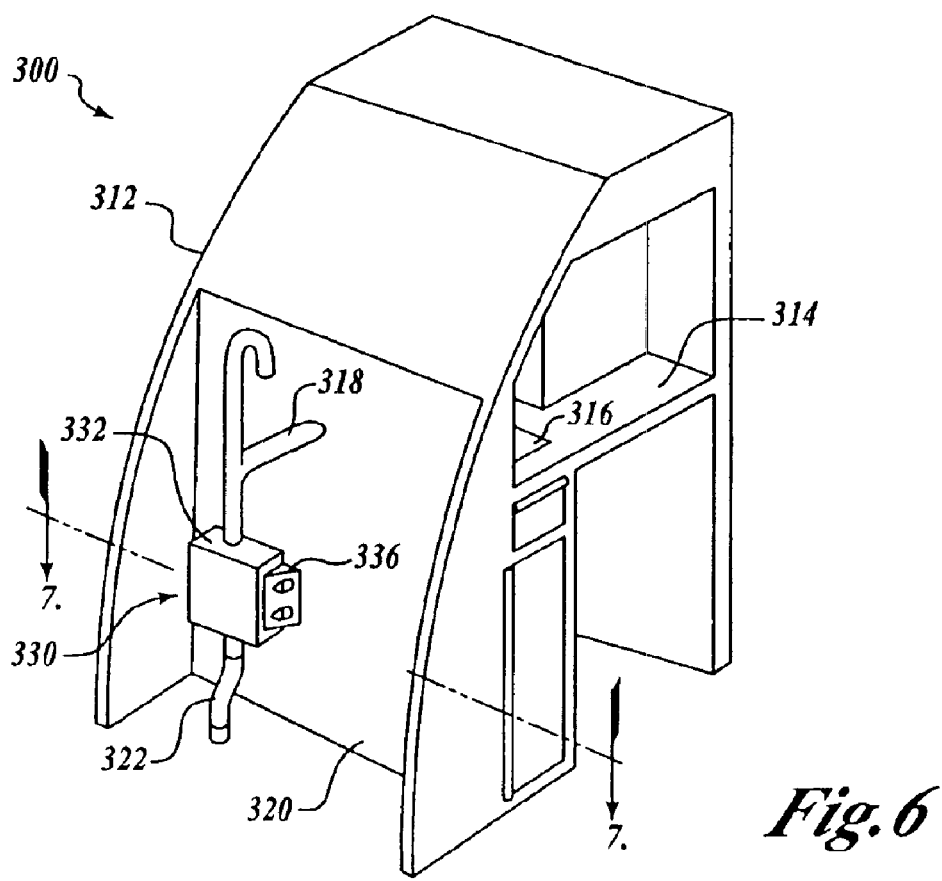
FIG. 6 is an isometric view of a galley assembly in accordance with another embodiment of the invention.
Figure 7:
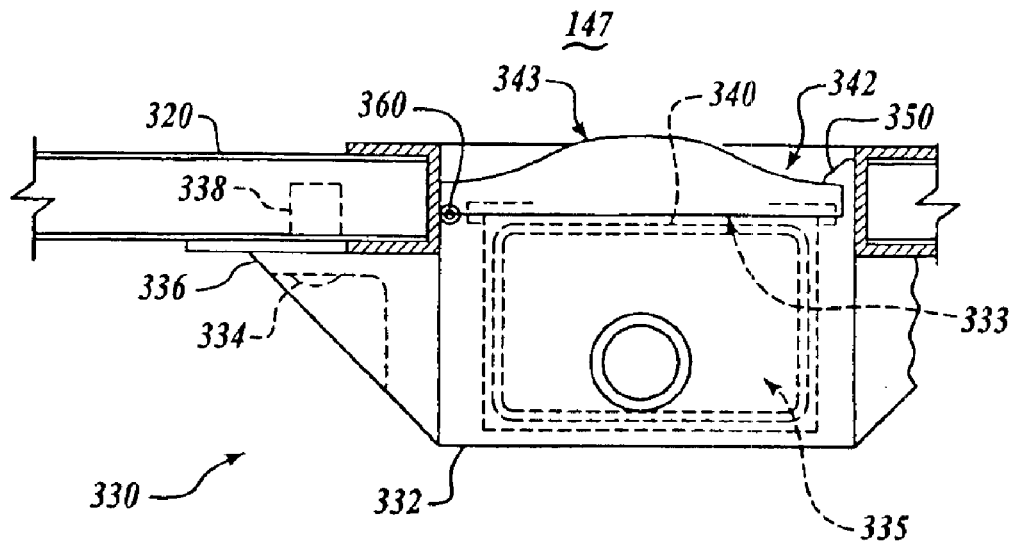
FIG. 7 is an enlarged, top elevational view of a drain strainer assembly of the galley assembly of FIG. 6.

FIG. 6 is an isometric view of a galley assembly 300 having a drain strainer assembly 330 in accordance with another embodiment of the invention. FIG. 7 is an enlarged, top elevational view of the drain strainer assembly 330 of FIG. 6. In this embodiment, the housing 332 is coupled to the support wall 320 by one or more fasteners 334 engaged through the flange members 336 of the housing 332. A door member 343 is attached to the housing 332 by a hinge 360. The door member 343 substantially covers the opening 333 that leads to the interior chamber 335 of the housing 332.

As best shown in FIG. 7, in operation, the strainer member 340 may be inserted through the access aperture 342 in the support wall 320 from the interior side 147 of the support wall 320, passing through the opening 333 and into the interior chamber 335 of the housing 332. The door member 343 may then be hingeably closed over the opening 333 and secured in position with the locking device 350.

The galley assembly 300 provides the above-noted advantages and may further improve the cost associated with maintenance of the drain strainer assembly 330. Because the door member 343 is attached to the housing 232 and is separate from the strainer member 340, the strainer member 340 may be cheaper to manufacture, thereby reducing the replacement cost of this component. The hingeable attachment of the door member 343 to the support wall 320 may also improve the accessibility of the strainer member 340, further simplifying and improving the maintainability of the drain strainer assembly 330 over the prior art.

Figure 8:
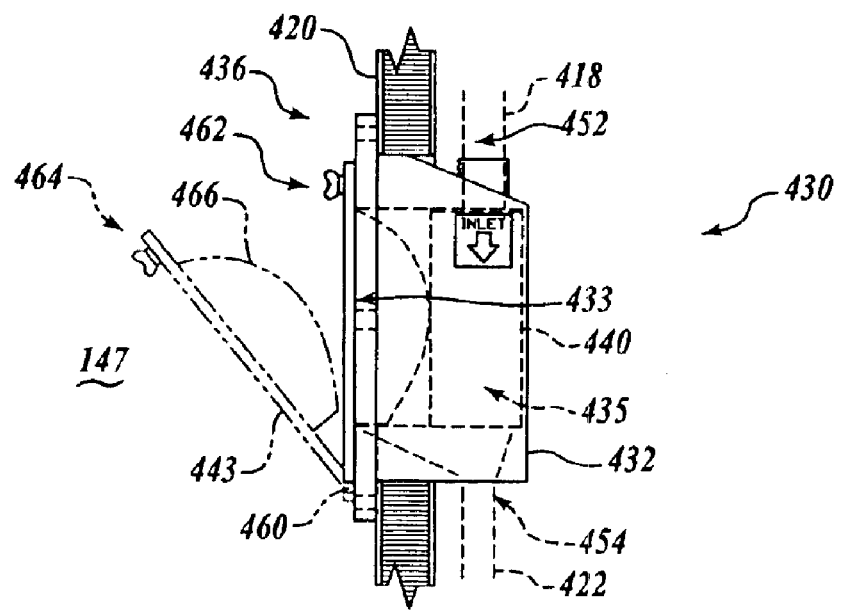
FIG. 8 is an enlarged, side elevational view of the drain strainer assembly in accordance with yet another embodiment of the invention.

FIG. 8 is an enlarged, side elevational view of a drain strainer assembly 430 in accordance with yet another embodiment of the invention. The drain strainer assembly 430 includes a housing 432 that includes a coupling assembly 436 for securing the housing 432 to the support wall 420. An inlet port 452 (coupleable to the first conduit 418) and an outlet port 454 (coupleable to the second conduit 422) are disposed through the housing 432 and fluidly communicate with an interior chamber 435 of the housing 432. In the embodiment shown in FIG. 8, the housing 432 includes a door member 443 that is pivotably coupled to the housing 432 by a hinge 460. In a first (or closed) position 462, the door member 443 sealably closes the opening 433 leading to the interior chamber 435 of the housing 432. In a second (or open) position 464, the door member 443 is moved away from the opening 433 to allow insertion (or removal) of a porous member 440 into (or from) the interior chamber 435.

As further shown in FIG. 8, the door member 443 includes a spacing portion 466. In the closed position 462, the spacing portion 466 is at least partially positioned within the interior chamber 435, engaging against the porous member 440 and securing the porous member 440 in position between the inlet and outlet ports 452, 454 of the housing 432.

In addition to the advantages described above, the inventive drain strainer assembly 430 may improve the accessibility of the porous member 440, thereby reducing the labor and expense associated with the maintenance operations involving the drain strainer assembly 430. Also, because the door member 443 and the hinge 460 are attached to the housing 432 rather than to the support wall 420, the repair and replacement of these components may be simplified, and the costs correspondingly reduced, compared with the prior art assembly.

Figure 9:
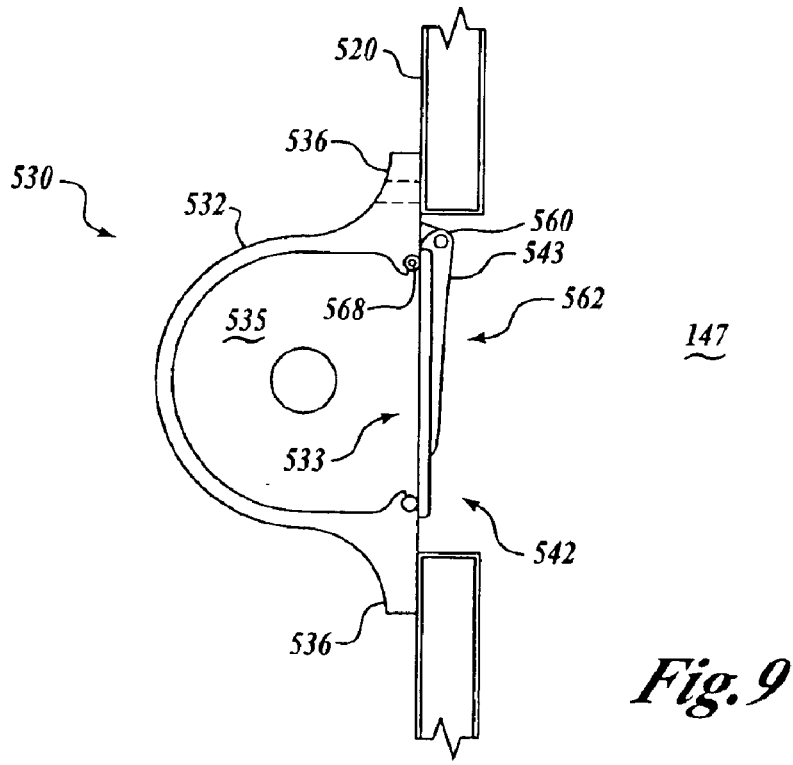
FIG. 9 is an enlarged, top cross-sectional view of a drain strainer assembly in accordance with a further embodiment of the invention.

FIG. 9 is an enlarged, top cross-sectional view of a drain strainer assembly 530 in accordance with a further embodiment of the invention. In this embodiment, the drain strainer assembly 530 includes an approximately cylindrical housing 532 surrounding an interior chamber 535. The housing 532 is attached to a support wall 520 by attachment assemblies 536, and includes a door panel 543 coupled to other portions of the housing 532 by a hinge 560. The hinge 560 and door panel 543 are accessible through an access aperture 542 disposed in the support wall 520. A seal member 568 is disposed about the opening 533 of the housing 532. As shown in FIG. 9, in the closed position 562, the door panel 543 is engaged against the seal member 568 to prevent leakage of waste fluids from within the interior chamber 535.

The drain strainer assembly 530 shown in FIG. 9 provides yet another example of an inventive drain strainer assembly that may advantageously provide substantial improvements over the prior art, including decreasing the number of components required, improving the efficiency of routine maintenance operations, and providing improved utilization of space within the vehicle.

Figure 10:
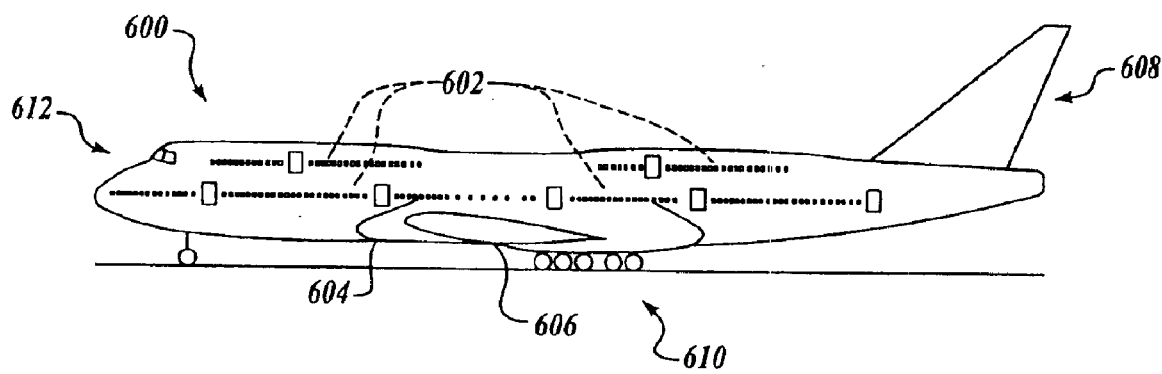
FIG. 10 is a side elevational view of an aircraft having a drain strainer installation in accordance with another embodiment of the invention.

FIG. 10 is a side elevational view of an aircraft 600 that includes one or more galley assemblies 602 having a drain strainer assembly 630 (not visible) in accordance with the invention. In general, all of the components of the aircraft 600, other than the galley assembly 602 having a drain strainer assembly 630 (not visible) in accordance with the invention, are of generally known construction and, for the sake of brevity, will not be described in detail herein. The aircraft 600 includes, for example, one or more propulsion units 604, wing assemblies 606 (or other lifting surfaces), a tail assembly 608, a landing assembly 610, a control system 612 (not visible), and a host of other systems and subsystems that enable proper operation of the aircraft 600. The aircraft 600 shown in FIG. 10 is generally representative of a commercial passenger aircraft, including, for example, the 737, 747, 757, 767, and 777 models commercially-available from The Boeing Company. The inventive apparatus and methods disclosed herein, however, may also be employed in any other types of aircraft, such as rotary aircraft or manned military aircraft, including those described, for example, in The Illustrated Encyclopedia of Military Aircraft by Enzo Angelucci, published by Book Sales Publishers, September 2001.

While certain embodiments of the invention have been illustrated and described, as noted above, many changes can be made without departing from the spirit and scope of the invention. Accordingly, the scope of the invention is not limited by the disclosure of the exemplary embodiments, but rather, the invention should be determined entirely by reference to the claims that follow.

What is claimed is:

1. A drain strainer assembly comprising:
   a housing having an interior chamber and defining an opening leading to the interior chamber, the housing having inlet and outlet ports disposed through the housing in fluid communication with the interior chamber, the housing further having at least one coupling device coupling the housing to a vertical support wall such that the opening is facing and at least approximately parallel with the support wall;
   a strainer member inserted through the opening and positioned in the interior chamber at least partially between the inlet and outlet ports; and
   a door member covering the opening.

2. The assembly of claim 1, wherein the housing includes a box-like receptacle and the opening comprises an open face of the box-like receptacle.

3. The assembly of claim 1, wherein the at least one coupling device includes a flange having a hole disposed therethrough.

4. The assembly of claim 1, wherein the at least one coupling device includes a plurality of flanges, each flange having a hole disposed therethrough and adapted to align with a threaded aperture disposed in the support wall.

5. The assembly of claim 1, wherein the inlet port is adapted to be coupled to an inflow conduit and the outlet port is adapted to be coupled to an outflow conduit.

6. The assembly of claim 1, wherein the door member is coupled to the strainer member.

7. The assembly of claim 1, wherein the door member is hingeably coupled to the housing.

8. The assembly of claim 1, further comprising a seal member disposed about the opening between the housing and the door member.

9. A galley assembly comprising:
   a support structure including a vertical support wall having an access aperture disposed therethrough;
   a catch basin coupled to the support structure; and
   a drain strainer assembly including
      a housing having an interior chamber and defining an opening leading to the interior chamber, the housing having inlet and outlet ports disposed through the housing in fluid communication with the interior chamber, the inlet port being fluidly coupled to the catch basin, the housing further having at least one coupling device coupled to the support wall such that the opening is facing and at least approximately parallel with the support wall and aligned with the access aperture;
      a strainer member inserted through the opening and positioned in the interior chamber at least partially between the inlet and outlet ports; and
      an access panel covering the opening.

10. The assembly of claim 9, wherein the housing includes a box-like receptacle and the opening comprises an open face of the box-like receptacle.

11. The assembly of claim 9, wherein the at least one coupling device includes a flange having a hole disposed therethrough.

12. The assembly of claim 9, wherein the at least one coupling device includes a plurality of flanges, each flange having a hole disposed therethrough and adapted to align with a threaded aperture disposed in the support wall.

13. The assembly of claim 9, wherein the access panel is coupled to the strainer member.

14. The assembly of claim 9, wherein the access panel is hingeably coupled to the housing.

15. The assembly of claim 9, wherein the access panel is hingeably coupled to the support wall.

16. The assembly of claim 9, further comprising a seal member disposed about the opening between the housing and the access panel.

17. An aircraft comprising:
   an airframe;
   a propulsion system operatively coupled to the airframe;
   a control system operatively coupled to the propulsion system; and
   a galley assembly coupled to the airframe, the galley assembly having
      a support structure that includes a vertical support wall having an access aperture disposed therethrough;
      a catch basin coupled to the support structure; and
      a drain strainer assembly including
         a housing having an interior chamber and defining an opening leading to the interior chamber, the housing having inlet and outlet ports disposed through the housing in fluid communication with the interior chamber, the inlet port being fluidly coupled to the catch basin, the housing further having at least one coupling device coupled to the support wall such that the facing and at least approximately parallel with the support wall and at least partially aligned with the access aperture;
         a strainer member inserted through the opening and positioned in the interior chamber at least partially between the inlet and outlet ports; and
         an access panel covering the opening.

18. The aircraft of claim 17, wherein the housing includes a box-like receptacle and the opening comprises an open face of the box-like receptacle.

19. The aircraft of claim 17, wherein the at least one coupling device includes a flange having a hole disposed therethrough.

20. The aircraft of claim 17, wherein the at least one coupling device includes a plurality of flanges, each flange having a hole disposed therethrough and adapted to align with a threaded aperture disposed in the support wall.

21. The aircraft of claim 17, wherein the access panel is coupled to the strainer member.

22. The aircraft of claim 17, wherein the access panel is hingeably coupled to the housing.

23. The aircraft of claim 17, wherein the access panel is hingeably coupled to the support wall.

24. The aircraft of claim 17, further comprising a seal member disposed about the opening between the housing and the access panel.

25. A method of providing a galley assembly, comprising:
   providing a support structure including a vertical support wall having an access aperture disposed therethrough;

coupling a catch basin to the support structure;

providing a housing having an interior chamber and an opening leading to the interior chamber;

coupling the housing to the support wall such that the facing and at least approximately parallel with the support wall and at least partially aligned with the access aperture;

fluidly coupling the housing to the catch basin;

inserting a strainer member through the opening into the interior chamber; and covering the opening with an access panel.

26. The method of claim 25, wherein providing the housing has inlet and outlet ports disposed therethrough in fluid communication with the interior chamber, and wherein fluidly coupling the housing to the catch basin includes fluidly coupling the inlet port with the catch basin.

27. The method of claim 25, wherein providing a housing includes providing a box-like receptacle, the opening of the housing being an open face of the box-like receptacle.

28. The method of claim 25, wherein coupling the housing to the support wall includes passing a threaded fastener through a flange portion of the housing having a hole disposed therethrough and threadedly engaging the threaded fastener into a threaded hole in the support wall.

29. The method of claim 25, wherein covering the opening with an access panel occurs simultaneously with inserting the strainer member.

30. The method of claim 25, wherein covering the opening with an access panel includes hingeably closing the access panel.

31. A method of installing a strainer member into a drain strainer assembly, the method comprising:

opening an access panel covering an access aperture disposed in a vertical support wall from an interior side of the support wall;

inserting a strainer member from the interior side of the support wall directly through an opening disposed in a housing into an interior chamber of the housing, facing and being substantially parallel to and substantially aligned with the access aperture in the support wall; and closing the access panel over the access aperture.

32. The method of claim 31, wherein opening the access panel covering the access aperture includes hingeably actuating the access panel.

33. The method of claim 31, wherein closing the access panel over the access aperture occurs simultaneously with inserting a strainer member.

34. The method of claim 31, further comprising removing a previously-installed stainer member directly from the housing through the opening to the interior side of the support wall.

35. A method of maintaining a drain strainer assembly, the method comprising:

opening an access panel covering an access aperture disposed in a vertical support wall from an interior side of the support wall;

removing a stainer member directly from a housing through an opening disposed in the housing to the interior side of the support wall, the opening facing and being substantially parallel to and substantially aligned with the access aperture in the support wall; and closing the access panel over the access aperture.

36. The method of claim 35, further comprising inserting a fresh strainer member from the interior side of the support wall directly through the opening into the housing.

37. The method of claim 36, wherein closing the access panel over the access aperture occurs simultaneously with inserting a fresh strainer member.

38. The method of claim 35, wherein opening the access panel covering the access aperture includes hingeably actuating the access panel.

* * * * *